REGULATED POWER SUPPLY CIRCUITS

Filed March 21, 1952 3 Sheets-Sheet 1

INVENTOR
Morris D. Nelson
BY [signature]
ATTORNEY

Dec. 6, 1955 M. D. NELSON 2,726,340

REGULATED POWER SUPPLY CIRCUITS

Filed March 21, 1952 3 Sheets-Sheet 2

INVENTOR
Morris D. Nelson
BY
Otis J. Mitchell
ATTORNEY

INVENTOR
Morris D. Nelson
BY
Edwin J. Mitchell
ATTORNEY

United States Patent Office 2,726,340

Patented Dec. 6, 1955

2,726,340

REGULATED POWER SUPPLY CIRCUITS

Morris D. Nelson, Bronx, N. Y., assignor to Radio Corporation of America, a corporation of Delaware Application March 21, 1952, Serial No. 277,827

21 Claims. (Cl. 307—150)

This invention relates to regulated power supply circuits and more particularly to flyback type high voltage power supply circuits operable from the horizontal deflection generator of the television receiver.

Although voltage regulation by means of a sensing control circuit has been highly desirable in television high voltage power supply circuits to maintain a fixed picture size and proper focus, it has been difficult to effect such regulation. This has been true since the high voltage in television receivers is generally derived from the horizontal deflection output circuit. The high voltage produced from the deflection circuit exceeds the ratings of currently produced grid control tubes obtainable at low cost. Therefore, a simple regulation circuit connecting a control tube or dummy load across the supply is not commercially feasible as may be the case in lower voltage power supply systems.

If an available tube is used for dummy load control, it must be connected to a lower potential position on the transformer and therefore draw more current than the rectifier tube to effect regulation. The current flow needed to regulate the high voltage at the lower potential position is not the same as that needed to provide proper deflection size and linearity. Regulation of the high voltage in deflection circuits by this method therefore normally causes undesirable changes of size and other changes in characteristics of the deflection waveform resulting in non-linear deflection, because the conditions for proper regulation and deflection linearity are not the same.

It is therefore an object of the present invention to provide improved self-regulating flyback power supply circuits.

Another object of the invention is to provide a regulated power supply circuit particularly adapted for use in television receivers and providing both good voltage regulation and good deflection linearity.

A further object of the invention is to provide a low cost regulated flyback supply system usable with currently available tubes.

There is therefore provided in accordance with the present invention a deflection generator circuit having an output transformer connected in a rectifier circuit for providing high voltage suitable for operation of a kinescope wherein a voltage sensing circuit connected to the high voltage circuit operates a dummy load device connected to the transformer and therefore provides constant loading of the output transformer with variations of current drawn from the high voltage supply. This is done in accordance with the invention without distortion of the deflection waveform and with currently available tubes.

Further objects and features of advantage of the present invention will be described throughout the following description of the invention. For a more clear understanding of the invention and its mode of operation the detailed description which follows should be read in connection with the accompanying drawing, wherein.

Figures 3, 4:
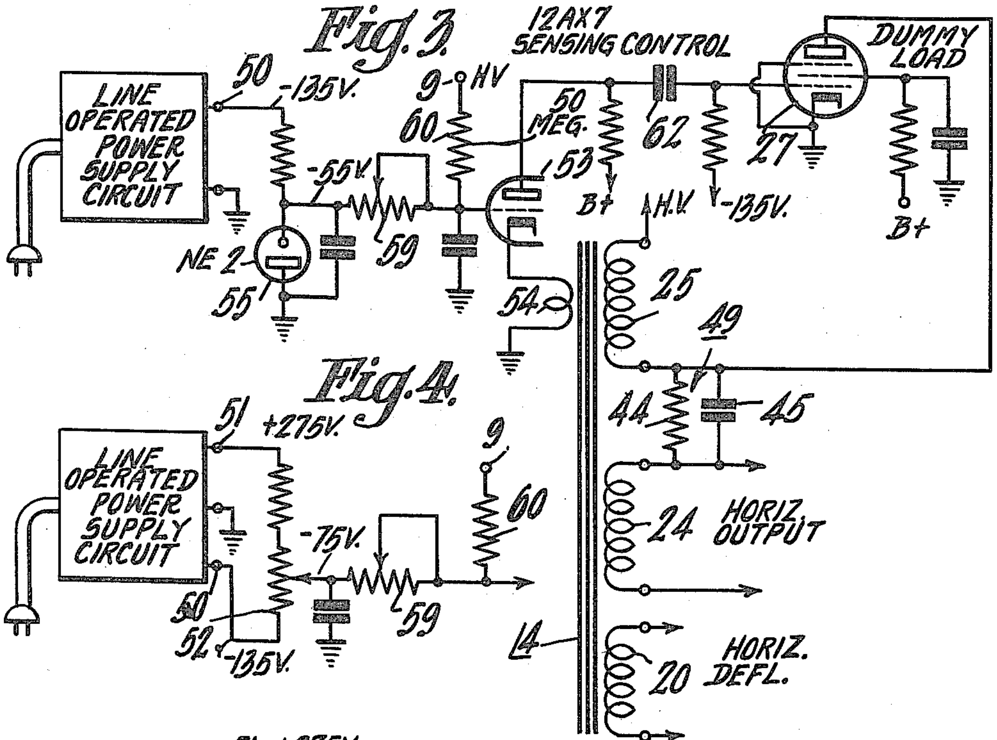
Figure 5:
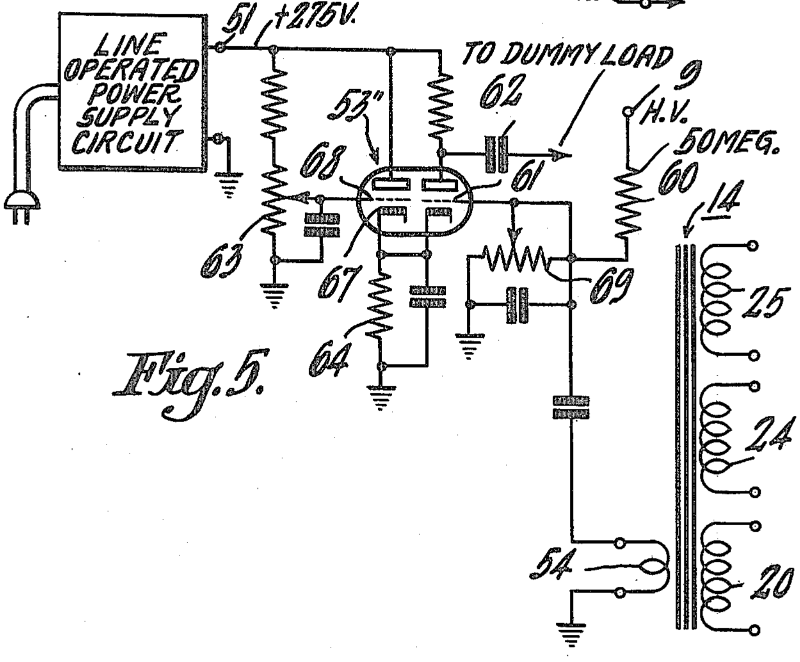
Figure 6:
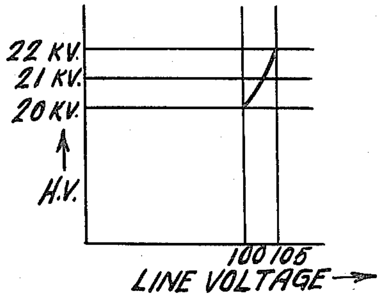
Figure 7:
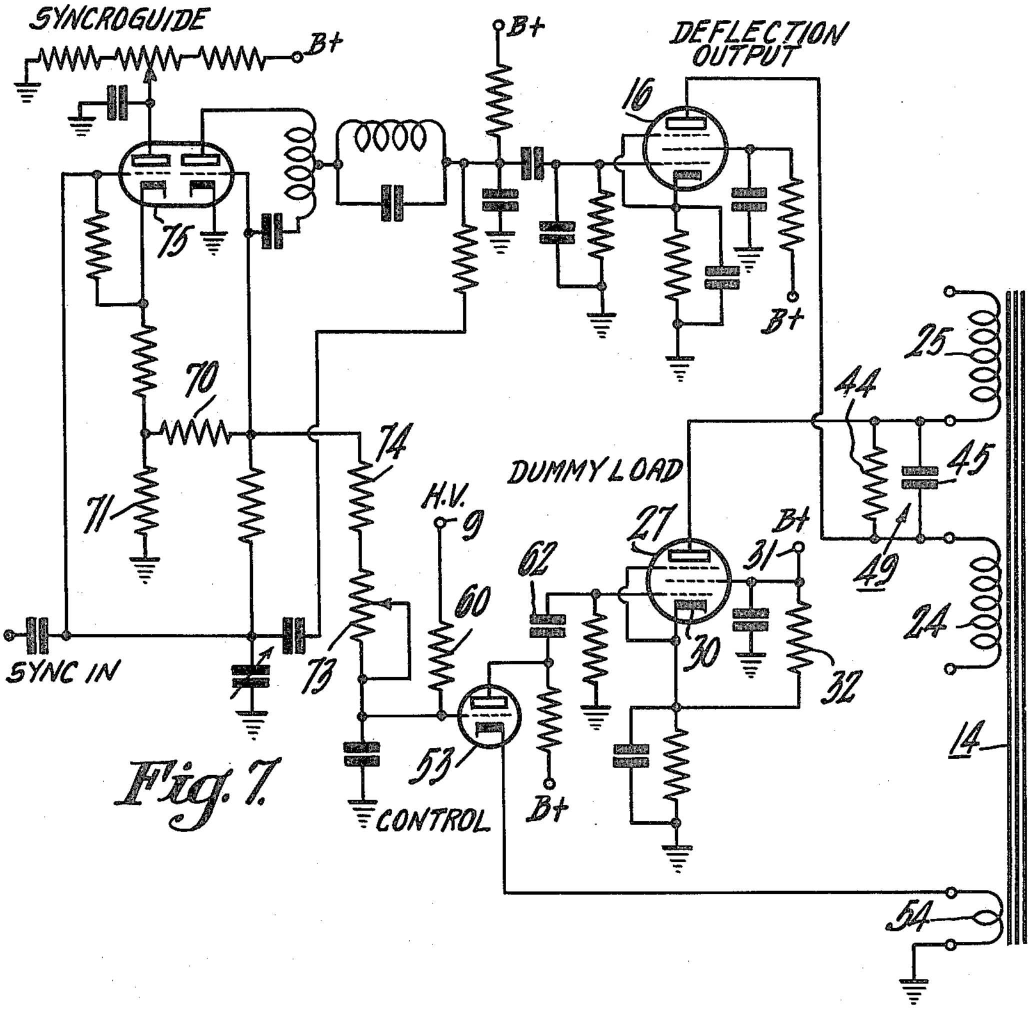

Figures 3, 4, and 5 are sensing control circuits constructed in accordance with further phases of the invention to keep picture size and linearity constant with either deflection circuit loading or line voltage power supply variations; and Figures 6 and 7 are respectively a graphical representation of operational characteristics of line voltage versus high voltage variations and a schematic circuit of a further embodiment regulated more precisely to provide improved television operation under such conditions in accordance with further teachings of the invention.

Throughout the respective figures like circuit elements will be designated with similar reference characters to facilitate comparison. Only pertinent portions of circuits are shown to avoid duplication.

Figure 1:
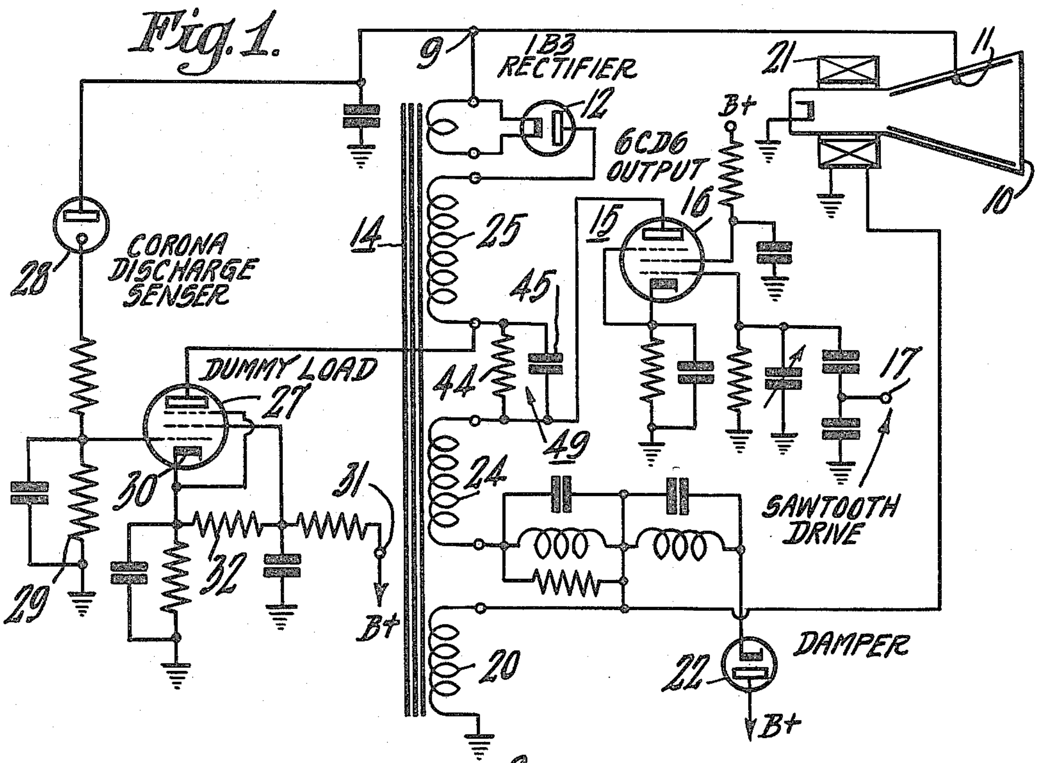
Figure 1 is a schematic circuit diagram of a regulated high voltage power supply system constructed in accordance with the invention.

Referring now to the diagram of Figure 1, a kinescope 10 has its accelerating anode terminal 11 coupled with the high potential terminal 9 of a flyback high voltage power supply circuit utilizing diode rectifier tube 12. This rectifier obtains energy from the deflection output transformer 14 during the return trace or flyback period of the sawtooth waveform provided by the horizontal output circuit 15 in a manner well known in the art. The horizontal output tube 16 derives driving potential from a suitable synchronized sawtooth generating circuit connected to its input terminal 17. The deflection output transformer 14 is provided with a winding 20 coupled to the deflection yoke winding 21 of the kinescope 10. The deflection output tube may be a 6CD6 or similar type which has a plate voltage rating sufficient to withstand pulses in the order of 6000 volts, and is preferably of high current capabilities, but depends upon the design of the individual deflection and high voltage circuits desired.

Damping diode 22 is provided in a conventional manner for use in the horizontal deflection circuit. A deflection circuit output winding 24 on transformer 14 is connected in series with a high voltage rectifier winding 25 by means of capacitor 45 to provide a step-up auto transformer for high voltage of several kilovolts for operating the kinescope 10. The high voltage generating circuit and the deflection circuit operate in a manner well known in the art, and therefore the mode of operation need not be discussed in detail.

In accordance with the present invention further structure is provided for controlled regulation of the potential available from the high voltage supply by means of a dummy load device comprising amplifier tube 27. A suitable sensing circuit is utilized for obtaining a control voltage for operating the dummy load tube. In this embodiment the sensing circuit comprises a corona discharge sensing tube 28 connected in a series circuit from the high voltage terminal 9 with the input resistor 29 of the dummy load tube 27 to ground. Corona discharge tubes well adapted for use in the voltage ranges for which this circuit is designed may be constructed in the manner described in the articles entitled "Voltage stabilization by means of corona discharge between coaxial cylinders" and "High voltage stabilization by means of the corona discharge between coaxial cylinders," published by the Naval Research Laboratory respectively in 1947 and 1950 as Reports 3140 and 3635 respectively.

This particular sensing circuit offers advantage over a conventional voltage divider circuit in that the corona discharge device 28 will have substantially a constant potential drop thereacross and therefore a much larger proportion of the voltage change in the high voltage supply will be developed across the input circuit of the dummy load tube. In this manner regulation efficiency is increased thereby keeping the output potential more nearly at a fixed value. It is noted that although the corona discharge tubes for the high potentials involved are not stable when large currents are passed, the regulation of the supply will cause any changes of current to be small. Therefore improved and entirely satisfactory operation may be obtained with this type discharge tube in the sensing circuit with normal load variations.

The dummy load tube is normally cut off during full load operation by means of a positive potential on the cathode 30 supplied by the B+ terminal 31 and adjusted to a suitable high voltage supply under full load, when the kinescope 10 is operating at full brightness. The output high voltage may be arbitrarily designated to have a potential of around 20 kilovolts. Should brightness of the kinescope 10 vary, or any portion of the load be removed in any other manner, the output voltage would tend to rise to some arbitrarily designated value such as 22 kilovolts. The sensing voltage across the dummy load input circuit resistor 29 will accordingly rise and cause the dummy load tube 16 to overcome its cutoff bias and conduct at the peaks of the horizontal flyback pulses applied to its anode, thus loading down the transformer 14 in substantially the same waveform and amplitude as that loading afforded by the rectifier tube 12, to maintain the high voltage in the neighborhood of 20 kilovolts.

Although the dummy load tube may be connected at any point on the output transformer winding sections 24, 25 and is shown operable near the high potential end of transformer section 25 to provide a load characteristic as nearly identical to that of the rectifier tube 12 as possible, the voltage ratings of available inexpensive grid controlled tubes will not be sufficient to operate at the desired 20 kilovolts. For this reason it has not been feasible to provide dummy load control of the high voltage power supply tube circuits heretofore.

Since the pulsed voltage at the junction of transformer windings 24 and 25, to which the anode of the output tube 16 is connected, is in the order of 6 kilovolts, a tube similar to currently produced 6CD6, 6BG6 or 6BQ6 types may be utilized for operation as the deflection output tube within potential rating. The current requirements of the dummy load are much smaller than that available with the listed tube types, being in the order of the current requirements of the high voltage supply, so that less expensive lower current output tubes are preferred where available.

If the dummy load tube were connected at the same terminal as the rectifier tube 12 it would be required to conduct at such time as the high voltage load is zero or minimum only that maximum amount of current representing the amount of peak current drawn by the high voltage rectifier during full load condition. Since the anode voltage on both the diode 12 and the dummy load tube 27 is provided by the flyback pulse at the respective taps of the output transformer 14, the peak conduction would be somewhat greater than the average direct current output of the high voltage supply, but would be in the order of a few milliamperes.

As before mentioned, since the dummy load tube 27 must be operated within its rated plate potential, currently produced inexpensive grid controlled tubes cannot be connected to carry pulses as great as 15 or 20 kilovolts such as developed at the high potential end of transformer section 25. The tube must therefore be connected to a tap where the potential is not more than about the 6 kilovolts existing near the tap to which the output tube 16 is connected at the junction of transformer sections 24 and 25. When this is done the dummy load circuit should conduct more current to provide the same loading effect than would be necessary if it were connected to a higher potential transformer terminal, since the effective overall loading on the deflection circuit produced by each unit of the current flow through the transformer, will be proportional to the ratio of turns in transformer sections 25 and 24.

When the dummy load tube anode is so connected to this lower tap, the higher value of current flow selected to compensate for changes in current in the high voltage rectifier depends upon the turns ratio of the transformer sections 25 and 24 to provide constant loading of the deflection circuit. However, even when the current is selected proportional to the turns ratio, the high voltage will not be precisely regulated unless a compensating network is added in accordance with a further phase of the invention, as discussed in more detail hereinafter. It is however also a necessary condition to cause the loading on the horizontal output circuit to be the same for full load and partial load conditions on the high voltage supply to prevent distortion of the deflection waveform supplied to the deflecting yoke 21. If the circuit is designed to satisfy the latter condition it will not provide for full high voltage regulation since the effect on the current passed by the rectifier tube 12 on the output voltage is not only dependent on the step up turns ratio of the transformer, but also on the impedance of the winding 25 since the transformer is not perfect.

Current flowing through the transformer section 25 during full load conditions therefore affords a voltage drop in the winding which is not present during partial load conditions. The dummy load tube however conducts with current flowing only through the transformer winding 24. If the dummy load tube is caused to pass more current to compensate for the drop and obtain proper regulation the current in transformer section 24 would then load the deflection circuit to a greater extent than with full load conditions thereby distorting the deflection waveform resulting in a reduction of the picture width or a non-linear sweep. For these reasons it has not heretofore been commercially feasible without extensive equipment to utilize a dummy load or otherwise effect controlled regulation in flyback type deflection circuits without distorting the deflection waveform.

In accordance with the present invention, however, when the rectifier circuit and the dummy load circuit are coupled to different positions on the output transformer, a compensation network 49 comprising resistor 44 and capacitor 45 is connected in series with both the dummy load circuit and the high voltage supply. This network has such direct current impedance that the dummy load when conducting properly to compensate for changes of loading on the horizontal deflection circuit due to changes in rectifier load will develop a voltage across the network 49 compensating for variations due to current flow in the transformer portion 25 connected between the dummy load and rectifier circuits. In effect the dummy load current flowing through resistor 44 provides a direct current voltage drop equal to that which would be developed in the transformer section 25 and therefore provides identical high voltage conditions to those existing at full load, while maintaining the same load conditions on the deflection output circuit load section 24 of the output transformer 14. Thus in accordance with the invention there is provided a regulated flyback power supply circuit which does not distort deflection linearity when high voltage loading conditions are changed.

The resistor 44 in addition to providing proper regulation with the aid of the dummy load tube 27 provides protection for the flyback power supply circuit against any damage due to short circuit conditions. This results because the network 49 has a direct current resistance connected in series with the high voltage power supply circuit which is high enough to cause a large percentage of the available voltage to be developed thereacross and thereby prevent high enough current flow to damage the power supply circuit. This feature is of importance also as a safety factor should personnel come in contact with the high voltage. The limited current flow available affords relatively little danger of fatal shock.

Since the dummy load tube 27 because of anode potential derived from flyback pulses conducts only in pulses, the bypass capacitor 45 is provided in the network 49 to maintain the direct current voltage drop across resistor 44 constant. The time constant of the compensating network therefore is preferably long as compared with the deflection or pulsing frequency. The capacitor 45 also provides low impedance coupling for the pulse voltage of winding 24 to winding 25 to provide auto-transformer action for the pulse voltage, as hereinbefore mentioned.

Direct current sensing to obtain a greater proportion of variations in the high voltage supply may be effected without the use of special tubes such as a corona regulator shown in Figure 1. A simple voltage divider network is not preferred as hereinbefore mentioned since the magnitude of voltage variation is divided down in the same proportion as the voltage. The sensing circuit of Figure 2, however, provides a large percentage of the total voltage variation as a direct current control potential for the dummy load tube 27.

In this case the voltage divider network comprises impedance devices 60, 80 and 81, the latter two being connected in series near the lower potential end of the voltage divider sensing network for the flyback high voltage supply. The first of these impedance devices 80 is connected in the input circuit of the control tube 53'. Neon tube 82 or some other suitable constant potential device is connected in the cathode circuit of the control tube to provide a fixed cathode bias thereby allowing the grid 85 to operate at a higher potential above ground. Voltage variations across the grid input resistor 80 for the control tube 53' therefore will provide a change in conduction of the sensing control amplifier circuit. The load resistor for the control tube 53' is connected between ground and the neon tube 82 and comprises the sensing resistor 81 which is commonly connected as the input resistor for the dummy load tube 27. Direct current amplification of the sensed control voltage at resistor 80 is developed across resistor 81 to provide additional amplified potential variations in the same sense as the normal sensing variations across the same resistor 81. Accordingly, the control potential across resistor 81 becomes a much higher percentage of the total variations and the dummy load 27 is more effective in preventing changes of high potential at terminal 9.

Figure 2:
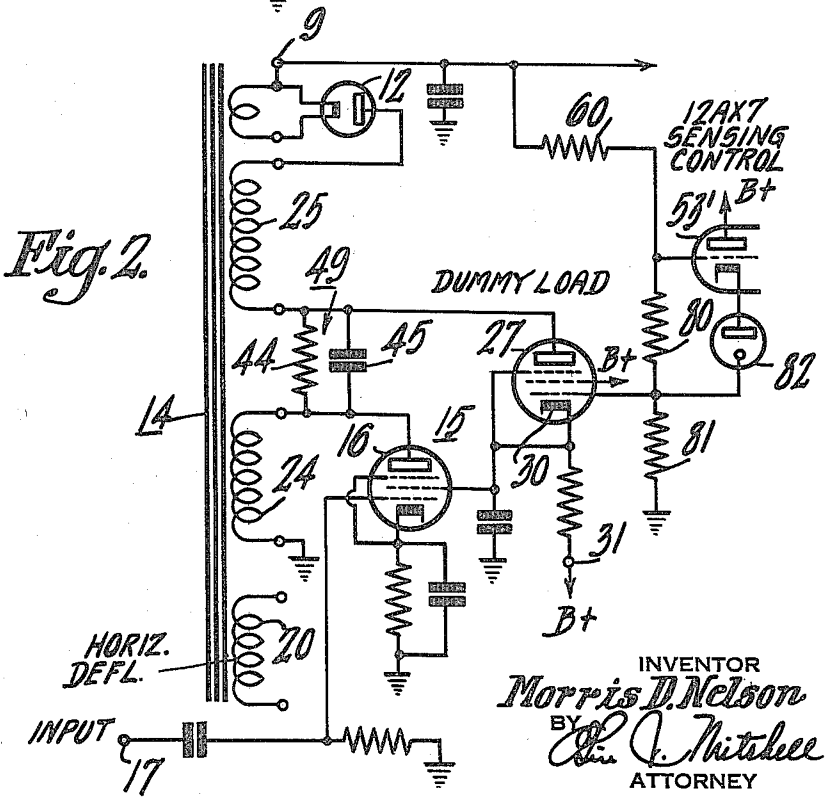
Figure 2 is a further embodiment of a regulated high voltage supply system of the invention.

Since the resistor 81 develops control voltage for the dummy load tube from both the voltage fluctuations normally appearing across resistor 81 due to its connection in the high voltage sensing circuit and the amplified variation in the resistor caused by conduction of the control amplifier tube, the control range is similar to that provided by the corona discharge tube of Figure 1. Therefore the circuit of Figure 2 provides with conventional control circuit elements a larger percentage of variation than possible in a simple voltage divider network.

Since the dummy load tube 27 is conducting only during the flyback pulse periods, and since direct current amplifier circuits are difficult to stabilize and impose more rigid direct current supply requirements, improved and more efficient operation due to higher gain available in an alternating current amplifier circuit may be attained by interrupting the amplified direct current sensing potential as in the circuit of Figure 3. Thus, the control amplifier tube 53 in this embodiment of the invention is operated as a pulse amplifier because of the flyback input voltage pulses developed across a deflection transformer winding 54 connected in the cathode circuit. Not only may more efficient amplification of the alternating current be provided in the control amplifier tube 53 for control of the dummy load 27 but other improvements result from the control pulses arriving on the grid circuit of the dummy load tube in coincidence with the high voltage pulses applied to the anode of the dummy load. Therefore improved regulation is provided by the sensing circuit described in this embodiment of the invention by utilizing pulsating drive voltage in the control amplifier circuit.

In the circuit of Figure 3 it is noted that the grid voltage of the control tube 53 is established at a negative value below cutoff due to voltage on neon tube 55 until the high voltage output rises above the regulation threshold value determined by adjustment of resistor 59. Thus, a positive sensing potential variable in accordance with changes in high voltage is developed at resistor 59 to control the direct current conduction level of the sensing control tube 53. The superimposed pulses from winding 54 therefore provide an alternating current component related to the direct current conduction and of such magnitude as to control regulation by way of the dummy load output current and arriving at the dummy tube in coincidence with the anode pulses from transformer 14.

When the B+ voltage source is not regulated, line voltage changes will cause the B+ output to change. The amplitude of the horizontal deflection currents and therefore the power available for high voltage will be altered. Similarly the amplitude of the vertical deflection currents, the focus current and other signals associated with the kinescope will vary as they are affected by the changes of B+ voltage. To allow for these changes it is desirable that the level at which the high voltage is regulated shall be altered automatically in a manner to minimize the effects of these changes on picture size, focus, and otherwise. When the control voltage pulses are properly dependent upon line voltage the regulation level is automatically adjusted in the above manner. A circuit for effecting such control is shown in Figure 4 wherein the sensing circuit of Figure 3 is replaced by a dual function sensing circuit having a resistive voltage divider network connected between the high potential terminal 9 and the negative line voltage power supply terminal 50. Any variations in line voltage will cause variations of the line voltage power supply potential at terminals 50 and 51 across which resistor 52 is connected. Therefore line voltage variations cause corresponding variations across the resistor 52. This variation is used to set level at which regulation will take place.

It is important to note here that the high potential is not kept at a constant level with variations of either high voltage supply circuit load or line voltage. Rather a decrease of line voltage may make the high voltage decrease. This is necessary since with a decrease of line potential the kinescope deflection circuit has less output potential to deflect the cathode ray beam. Therefore, the high voltage is decreased making the beam easier to deflect and focus and thereby making the picture size and linearity remain more constant.

Control of the amplifier tube 53 is effected by negative grid potential available from a line operated power supply circuit in the circuits of Figures 3 and 4. When there is only positive potential available from the line voltage power supply circuits for biasing the control amplifier tube 53, to thereby establish the amplification level of input pulses, control may be effected by means of the modified circuit shown in Figure 5. The control tube 53'' is in this case a duo-triode in which the right hand section functions as a pulse amplifier in the same general basic manner as the single section tube 53 of Figure 3.

Thus a pulsating input voltage is supplied by the transformer winding 54 with opposite polarity to that use in the diagram of Figure 3 because it is applied in this case to the grid 61 of the control tube. This pulsating voltage is combined at the grid input terminal 61 with a portion of the direct current high voltage sensing fluctuations obtained from terminal 9 across the variable resistance 69 of the voltage divider sensing circuit to provide a signal input potential for the right hand tube section. Thus at the grid 61 of the control tube is a positive potential upon which the pulsating waveform from the deflection transformer winding 54 is superimposed to cause the tube to cut off during the negative pulse peaks. Amplification is thus controlled by the direct current bias voltage to provide an output positive pulsating potential of appropriate amplitude for regulating, which potential is conveyed for control of the dummy load tube by capacitor 62.

Sensing from the line voltage power supply is provided in the left hand section of the control tube 53'' by means of a voltage divider from the B+ terminal in which the variable resistor 63 is connected to the grid 68 of the left hand control tube section 67. Conduction of this section 67 due to a positive grid potential will provide a large current flow through the cathode resistor 64 which biases both sections of the control tube 53'' with a potential dependent upon line voltage variations. Either a change of line voltage or a change in the flyback supply potential therefore will cause the control amplifier 53'' to change its conduction and to accordingly change the amplitude of the sensing control output pulses for the dummy load. In this embodiment the amplification level of the pulsating control voltage also changes with both the flyback high voltage variations and line voltage variations as hereinbefore described.

Because line voltage variations may not effect the high voltage supply circuit in a linear manner in all cases a simple voltage divider network across the line voltage power supply may not provide the desired operating characteristics for complete high voltage compensation due to changes in line voltage. A particular non-linearity function may not be established to hold true for all circuit combinations. In general, however, the changes in line potential should be followed more rapidly than changes in the high voltage supply so that picture size and linearity may be held more constant, because of the effect of line voltage changes on the deflection output circuit from which the high potential is derived. For example consider the graph of Figure 6 where a 5 per cent line voltage variation causes a 10 per cent variation of high potential.

To obtain proper regulation under such conditions nonlinear resistance elements may be used in the voltage divider 50, 51 of Figure 4 or the circuit of Figure 7 may be used to provide a non-linear function of the line voltage variation. The control amplifier tube 53 is connected to sense high voltage variations by means of a resistive voltage divider where resistors 70 to 74 comprise the high voltage sensing circuit. Resistors 70 and 71 are also connected in the horizontal oscillator grid circuit. The particular oscillator circuit illustrated is a frequency controlled oscillator circuit well known in the art as "synchroguide" and therefore the details of operation need not be discussed in the present case except where necessary to explain its connection with the present embodiment of the invention. The grid potential of any other type of horizontal oscillator circuit may be used in the sensing circuit to provide the requisite potential characteristic for a faster rate of change of regulation with line voltage variations.

Changes in line voltage will be reflected in the B+ potential available at the right hand anode of the duo-triode oscillator tube 75 and therefore cause a change in tube conduction and grid leak bias on the right hand tube section. Thus the voltage across the grid resistor 70 will vary with changes in line voltage but not in a linear manner, because the characteristics of the oscillator tube 75 cause it to develop a self-bias which changes value at a faster rate than the B+ potential thus causing the potential drop across grid resistor 70 to have a value suitable for input potential to the control tube 53. Accordingly a nonlinear sensing circuit for line voltage variations is provided. This control potential is applied to the control amplifier tube 53 together with the flyback high voltage sensing control potential which is developed across the high resistance series resistors 73 and 74. Accordingly the dummy load, because of its grid input potenial, controls the level of amplified control pulses and is caused to compensate for changes in either of the high voltage circuits in such a manner that the high voltage stays nearly constant with changes in load and adjusts the output regulation level so that the deflection output circuit provides almost constant picture width and a linear deflection waveform.

In accordance with the teachings of the invention therefore, it is possible to closely regulate the high voltage of a flyback power supply circuit. By means of the compensating network of the invention which is connected in series with both the current of a dummy load device and the high potential new improved results may be obtained not heretofore known and therefore means for regulating flyback power supply circuits without adversely affecting the linearity or amplitude of the deflection output circuit are made available. Further improvement in operating characteristics is provided by operating the dummy load device with both grid input and anode supply potential comprising pulses arriving in synchronism. Having therefore described various phases of the invention and the mode of operation thereof, those features believed descriptive of the nature of the invention are defined with particularity in the appended claims.

What is claimed is:

1. A flyback high voltage power supply circuit comprising in combination, a sawtooth generating circuit including an output amplifier tube, a deflection output transformer coupled to said tube, a high voltage rectifier circuit coupled to said transformer, a sensing circuit for developing potentials proportional to the high voltage provided by said rectifier, and a dummy load circuit comprising an amplifier tube coupled between said sensing circuit and said transformer for maintaining a fixed load on said output transformer upon changes of load conditions of said rectifier circuit.

2. A circuit as defined in claim 1 wherein said rectifier circuit and said dummy load circuit are coupled to different positions on said transformer, and a compensation network is connected in the dummy load tube circuit having such impedance that the dummy tube load will both compensate for changes in rectifier voltage and the variations due to current flow in the transformer portion connected between said dummy load and said rectifier circuit.

3. A circuit as defined in claim 2 wherein said compensation network comprises a parallel resistance and capacitance connected in series with windings of said transformer.

4. A circuit as defined in claim 3 wherein the dummy load tube and the output amplifier tube have similar potential rating characteristics and said compensation network is connected between transformer terminals to which the last mentioned tubes are respectively connected.

5. A circuit as defined in claim 1 wherein said sensing circuit comprises an amplifier tube and a source of pulsating energy connected to the input terminals of said tube.

6. A circuit as defined in claim 5 wherein means is provided deriving the pulsating energy from the deflection waveform.

7. A circuit as defined in claim 1 wherein a further line operated power supply circuit is supplied and said sensing circuit comprises an impedance network having a common portion coupled to both the line operated power supply circuit and the high voltage power supply circuit whereby regulation is provided for changes of potential in either the high voltage power supply or the line operated power supply.

8. A circuit as defined in claim 7 wherein said impedance network includes a first amplifier with an input terminal connected to a positive point on said line operated power supply circuit, a second amplifier with an input terminal connected to said high voltage power supply circuit and said common portion comprises impedance means in the input path of both amplifiers.

9. A circuit as defined in claim 7 wherein non-linear impedance means is coupled between said line operated power supply and said sensing circuit.

10. A circuit as defined in claim 9 including a horizontal oscillator circuit wherein said non-linear impedance means comprises an oscillator tube connected to said line operated power supply and sensing potential is obtained from the grid circuit of said horizontal oscillator circuit.

11. A circuit as defined in claim 1 wherein said sensing circuit comprises an amplifier circuit having a tube with grid and cathode input terminals, a voltage divider connected between the high potential supply circuit and ground, an input circuit for said tube comprising an intermediate portion of said voltage divider and a constant voltage device connected in series in the order named between said grid and cathode, a supply potential source for said tube, and a circuit connecting said source to said tube including a portion of said voltage divider between said cathode and ground, said portion being connected to the input terminals of said dummy load amplifier tube whereby a large control range is provided with small changes of potential in said high voltage power supply circuit.

12. A control circuit for power supply regulators comprising in combination, a pair of terminals adapted for connection to a high potential source, a voltage divider connected to said terminals for sensing changes of potential of said source, said voltage divider network comprising a pair of impedance devices connected in series in said voltage network near the lower potential one of said terminals, a constant potential device, an amplifier tube having a pair of input terminals connected respectively to the first of said impedance devices and said constant potential device, and a circuit connecting the other of said impedance devices and said constant potential device serially in the discharge path of said tube whereby variations of potential in said high potential source cause amplified variations of potetnial across the last mentioned impedance device.

13. A voltage regulating circuit comprising in combination, a sweep output circuit, a flyback power supply connected to one part of said output circuit, and a regulation control amplifier connected to another part of said output circuit for maintaining a constant output potential from said power supply including a compensating network connected serially between said two parts of the high potential output circuit.

14. A voltage regulating circuit comprising in combination, a sweep output transformer, a deflection generator circuit connected to said transformer, a flyback power supply circuit conected to a winding of said transformer, a regulation circuit connected to another winding of said transformer, and a compensating impedance network connected in a common circuit with both the regulation circuit and said power supply circuit.

15. A circuit as defined in claim 13 wherein said compensating network comprises a parallel resistor and capacitor.

16. In a high voltage power supply circuit regulated by a loading device operable to conduct current proportional to variations in output potential, a network comprising an impedance connected so as to be traversed by both the current conducted by said loading device and the current conducted in said high voltage power supply circuit.

17. In a high voltage power supply circuit operable from flyback pulses, regulation means comprising, a dummy load device connected in said circuit, a pulsating input potential source synchronous with said flyback pulses coupled to said load device, and means establishing the level of said input potential in accordance with potential variations in said power supply circuit.

18. In a high voltage power supply circuit the method of controlled regulation comprising the steps of regulating the high voltage power supply circuit to maintain a substantially constant potential with variations of loading, and changing the value of said constant potential in correspondence with line voltage variations.

19. In a high voltage power supply circuit, a direct current sensing circuit for said amplifier to detect changes in output potential, a sensing amplifier circuit coupled to said sensing circuit, regulating means in said power supply circuit driven by said amplifier, and pulsing means in said amplifier circuit for providing alternating current output pulses variable in amplitude in accordance with said changes of output potential.

20. A circuit as defined in claim 19 wherein said regulating means comprises an amplifier circuit operable from plate potential pulses substantially coincident with said alternating current output pulses.

21. In a high voltage power supply circuit, regulation means comprising a sensing control circuit for high potential variations, a non-linear sensing control circuit for line voltage variations, and regulating means operable from both said sensing control circuits.

References Cited in the file of this patent

UNITED STATES PATENTS

| | | |
|---|---|---|
| 2,351,681 | Haug | June 20, 1944 |
| 2,386,458 | Haug | Oct. 9, 1945 |
| 2,427,149 | Poch | Sept. 9, 1947 |
| 2,513,983 | Winn | July 4, 1950 |